United States Patent
Miller et al.

(10) Patent No.: US 8,214,589 B2
(45) Date of Patent: Jul. 3, 2012

(54) DATA STORAGE SYSTEM REDUNDANCY SCHEME VERIFICATION

(75) Inventors: Michael Miller, Eden Prairie, MN (US); Mark Gaertner, Vadnais Heights, MN (US)

(73) Assignee: Seagate Technology LLC, Cupertino, CA (US)

( * ) Notice: Subject to any disclaimer, the term of this patent is extended or adjusted under 35 U.S.C. 154(b) by 621 days.

(21) Appl. No.: 12/403,623

(22) Filed: Mar. 13, 2009

(65) Prior Publication Data

US 2010/0235572 A1  Sep. 16, 2010

(51) Int. Cl.
  *G06F 12/00* (2006.01)
(52) U.S. Cl. ......... 711/114; 711/4; 711/100; 711/161; 711/162; 714/6.2; 714/6.21; 714/6.22; 714/6.23
(58) Field of Classification Search ............. 711/4, 100, 711/114, 161–162; 714/5–6
  See application file for complete search history.

(56) References Cited

U.S. PATENT DOCUMENTS

| | | | |
|---|---|---|---|
| 4,933,939 A | 6/1990 | Kendall et al. | 371/5.5 |
| 5,128,944 A | 7/1992 | Flaherty et al. | 371/29.1 |
| 5,574,855 A | 11/1996 | Rosich et al. | 395/183.17 |
| 5,881,076 A | 3/1999 | Murray | 371/49.1 |
| 5,883,904 A | 3/1999 | Arimilli et al. | 371/10.2 |
| 5,889,934 A | 3/1999 | Peterson | 395/182.04 |
| 6,195,761 B1 | 2/2001 | Kedem | 714/6 |
| 6,233,696 B1 | 5/2001 | Kedem | 714/6 |
| 6,389,511 B1 | 5/2002 | Kedem | 711/114 |
| 6,480,970 B1 * | 11/2002 | DeKoning et al. | 714/6.12 |
| 6,993,677 B1 | 1/2006 | Wilner | 714/6 |
| 7,177,993 B1 | 2/2007 | Kiselev et al. | 711/162 |
| 7,472,241 B2 * | 12/2008 | Uchiyama et al. | 711/162 |
| 2005/0223043 A1 * | 10/2005 | Randal et al. | 707/200 |
| 2006/0248295 A1 | 11/2006 | Uchiyama et al. | |
| 2008/0256420 A1 * | 10/2008 | Hafner et al. | 714/770 |

FOREIGN PATENT DOCUMENTS

WO   2008/073219   6/2008

* cited by examiner

*Primary Examiner* — Tuan Thai
*Assistant Examiner* — Zhuo Li
(74) *Attorney, Agent, or Firm* — Nicholas Beaulieu; Westman, Champlin & Kelly, P.A.

(57) ABSTRACT

Data storage systems are provided. Some embodiments of data storage systems include a storage device controller and a plurality of storage devices. The plurality of storage devices are illustratively in a redundancy scheme and the storage device controller receives from the plurality of storage devices a plurality of symbols. In one embodiment, each of the plurality of symbols is representative of data in the redundancy scheme, and the storage device controller verifies the consistency of the redundancy scheme based at least in part on the plurality of symbols.

24 Claims, 6 Drawing Sheets

DATA STORAGE SYSTEM REDUNDANCY SCHEME VERIFICATION

BACKGROUND

Data storage systems often use redundancy schemes to reduce the likelihood of data loss. Redundancy schemes commonly include storing data on multiple physical or logical devices. If data on one of the devices is lost, the lost data can be recovered using data on the other devices.

Data storage systems that use redundancy schemes often include the capability to verify the integrity of the data in the system. For example, in a data storage system that uses two storage devices in a mirror configuration, the storage system may verify that the data in both of the devices is the same.

Data storage system redundancy scheme verifications have certain common disadvantages. Verifications often require significant system resources such as memory and processor capacity. Verifications often require significant amount of time and can negatively impact a user's experience in terms of user interaction with the storage system.

SUMMARY

Data storage systems are provided. Some embodiments of data storage systems include a storage device controller and a plurality of storage devices. The plurality of storage devices are illustratively in a redundancy scheme and the storage device controller receives from the plurality of storage devices a plurality of symbols. In one embodiment, each of the plurality of symbols is representative of data in the redundancy scheme, and the storage device controller verifies the consistency of the redundancy scheme based at least in part on the plurality of symbols.

DETAILED DESCRIPTION

The present invention is generally directed to data storage systems and methods system involving redundancy scheme verification. The present invention is particularly suited to use of a storage device controller to verify consistency of the redundancy scheme for a plurality of storage devices. In certain embodiments, consistency is verified by the storage device controller using symbols that are representative of at least a portion of data in the redundancy scheme. While the present invention is not necessarily so limited, a better understanding of the invention will be found by reading the detailed description and exemplary embodiments that follow.

Figure 1:
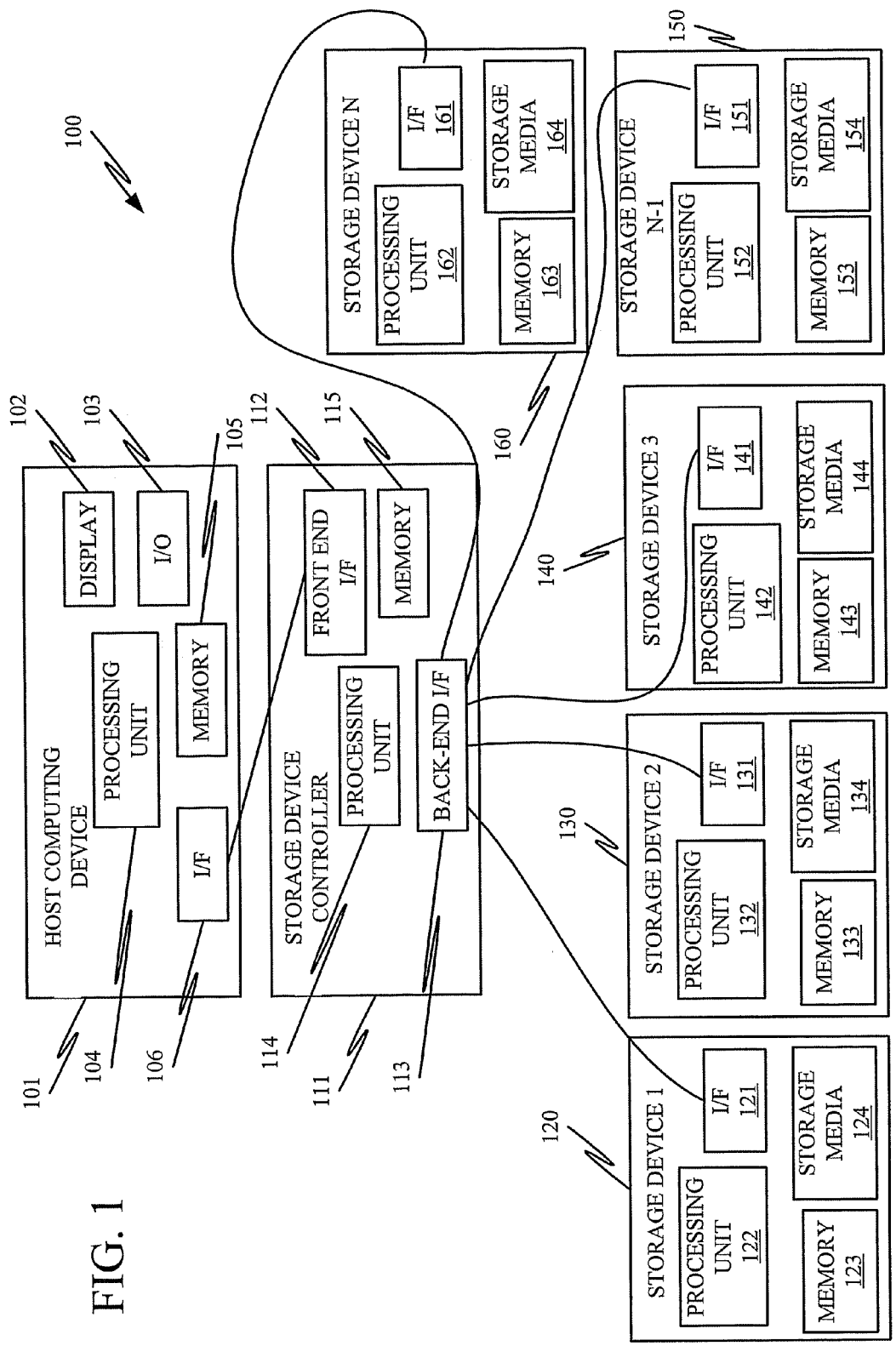
FIG. 1 is a block diagram of a storage system.

FIG. 1 is a block diagram of an illustrative data storage system 100. While embodiments of this disclosure are described in terms of system 100, variations on system 100 and other systems should be considered within the scope of the present disclosure. System 100 includes a host computing device 101, a storage device controller 111, and storage devices 120, 130, 140, 150, and 160. Host computing device 101 is illustratively a personal computer, a laptop, a server, or some other similar type of computing device. Device 101 includes a display 102 such as an LCD or CRT monitor for providing a graphical interface to a user, and input and output (I/O) devices 103. I/O devices include keyboards, mice, cameras, microphones, or any other device that allows for a user to input data and interact with host computing device 101. Host computing device 101 also includes processing unit 104, memory 105, and interface 106. Processing unit 104 executes computer program instructions and processes data. Memory 105 includes volatile and non-volatile memory for storing computer executable instructions and data. Interface 106 enables host computing device 101 to connect to, and exchange data with other electronic devices such as storage device controller 111.

Storage device controller 111 manages a plurality of storage devices and presents them to host computing device 101 as logical units. Controller 111 is capable of employing numerous redundancy schemes such as, but not limited to, mirror configurations and parity configurations. One embodiment, not by limitation, of a storage device controller 111 is a RAID controller. Controller 111 includes front-end interface 112, back-end interface 113, processing unit 114, and memory 115. Front-end interface 112 enables controller 111 to connect to, and exchange data with, other electronic devices such as host computing device 101. Back-end interface 113 enables controller 111 to connect to, and exchange data with other electronic devices such as storage devices 120, 130, 140, 150, and 160. Processing unit 114 executes computer program instructions and processes data, and memory 115 includes volatile and non-volatile memory for storing computer executable instructions and data.

Storage devices 120, 130, 140, 150, and 160 are illustratively mass storage devices. Embodiments of storage devices, not by limitation, include solid state devices such as flash memory and magnetic devices such as hard disc drives. Storage device 120 includes an interface 121, processing unit 122, memory 123, and storage media 124. Interface 121 enables storage device 120 to connect to, and exchange data with, other electronic devices such as storage device controller 111. Processing unit 122 executes computer program instructions and processes data. Memory 123 includes volatile and non-volatile memory for storing computer executable instructions and data. Storage media 124 stores data, and illustratively includes a relatively large capacity such as several gigabytes to a terabyte or more. Media 124 illustratively stores information in solid state media, magnetic media, optical media, and/or any other storage media. Storage devices 130, 140, 150, and 160 include the same or similar components as storage device 120, and the components are numbered in FIG. 1 accordingly.

Figure 2:
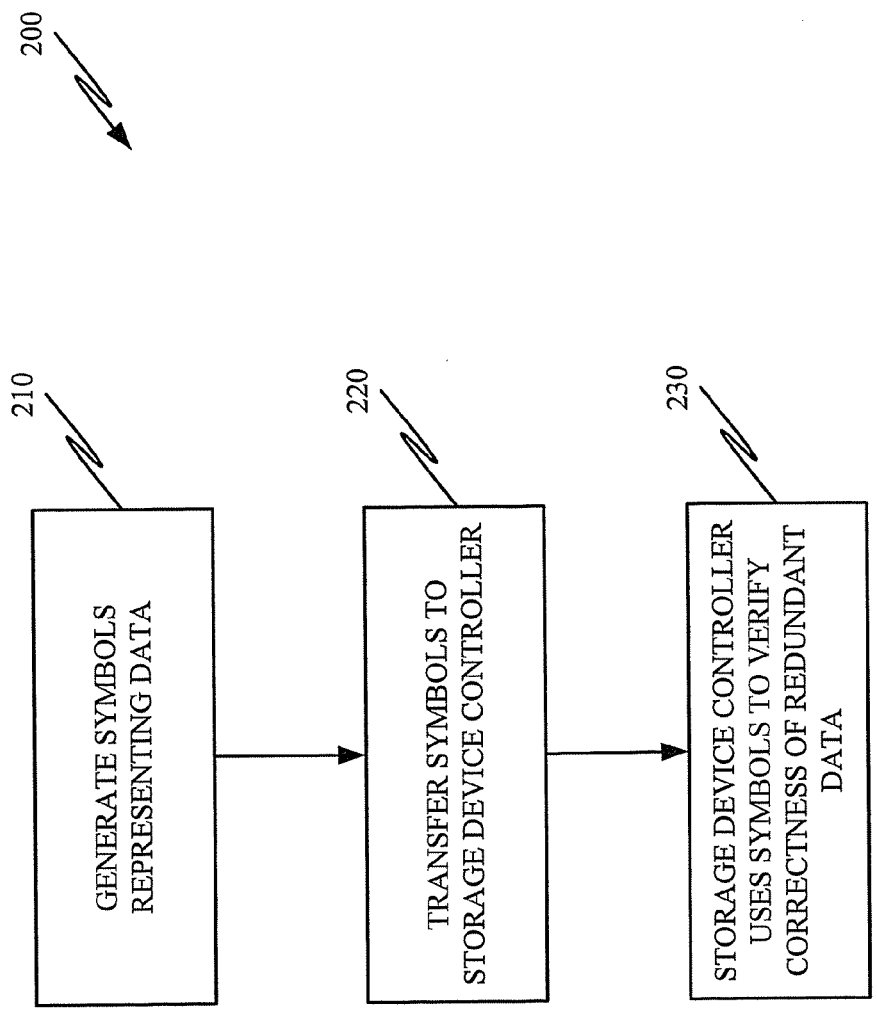
FIG. 2 is a flow diagram of a method of verifying data in a redundancy scheme.

FIG. 2 is a flow diagram illustrating a method 200 of verifying the correctness of redundant data in a redundancy scheme for systems such as, but not limited to, system 100 in FIG. 1. At step 210, symbols representing data are generated. The size of the symbol is optionally selected. Any size or combination of sizes may be used. The symbols representing the data are illustratively smaller than the data itself. For example, one 16 bit symbol may be generated for every 512 bytes of data. Advantages exist in both choosing a smaller size symbol and in choosing a larger size symbol. Smaller sized symbols reduce the amount of information that needs to be transferred between devices such as storage devices and controllers. Smaller sized symbols also reduce memory and processing power requirements. Larger sized symbols on the other hand reduce the likelihood of not detecting a redundancy scheme failure (i.e. inconsistent redundant data). For example, for a given size of underlying data such as 1024 bytes, a 32 bit word symbol is statistically more likely to detect inconsistent data than a 16 bit word symbol.

Embodiments of the present disclosure are also not limited to any particular method of generating symbols. In one embodiment, mathematical functions such as polynomial equations are used to generate symbols. Other operations such as, but not limited to, "XORing" functions, concatenating, hashing, and error detection codes are also illustratively used to generate symbols. Many various methods are known that transform a set of data into a smaller representation of that data (i.e. a symbol), and all such methods are within the scope of the present disclosure.

It is also worth noting that the generation of symbols is not limited to any specific device. For example, and not by limitation, symbols may be generated by a controller such as controller 111 in FIG. 1, by storage devices such as devices 120, 130, 140, 150 and 160 in FIG. 1, by host device 101 in FIG. 1, or by any combination thereof. In one embodiment, storage devices generate symbols upon a request from a controller. In another embodiment, storage devices periodically generate symbols without a request from a controller and store the symbols locally (e.g. symbols generated by device 120 would be stored in memory 123 or storage media 124). In yet another embodiment, a storage device controller generates symbols that are transferred to and stored by storage devices. For example, controller 111 may store a symbol on a device such as device 120 before, concurrently, or after controller 111 writes corresponding data to device 120. In yet another embodiment, a storage device controller transfers other information to a storage device such as a time stamp that may also be optionally used in verifying the consistency of a data redundancy scheme.

In one embodiment, for illustrative purposes, and not by limitation, storage devices include error detection code functions that generate symbols. Functions to generate symbols are illustratively unique to the vendor producing the data storage device, such that all storage devices need to be from the same vendor to verify the consistency of a redundancy scheme. Functions to generate symbols are also illustratively implemented as industry standards allowing the interchange of storage devices from different vendors.

At step 220, the symbols representing the data are illustratively transferred to a storage device controller such as controller 111 in FIG. 1. Step 220 is not limited to any particular methods or devices. In one example, symbols are transferred to a controller upon a request by a controller. In another embodiment, storage devices transfer symbols to a controller without a request. For example only, and not by limitation, a storage may transfer a symbol based upon a predetermined periodic time, based upon an amount of activity, or based upon some condition such as a detected error.

At step 230, the storage device controller uses the symbols to verify the correctness of redundant data in a redundancy scheme. Step 230 and method 200 are not limited to any particular redundancy scheme. Examples of redundancy schemes in which method 200 are used include, but are not limited to, mirror configurations and parity configurations. Examples of method 200 used in various redundancy schemes are illustrated later in the disclosure.

In one illustrative embodiment of method 200, storage devices such as devices 120, 130, 140, and 150 in FIG. 1 have both data and redundant data. For example, storage device 120 may have data and storage device 130 may have a mirror of that data. The mirror data of storage device 130 is redundant data. In an example, for illustration only, and not by limitation, the same process is used to generate the symbol for data and for redundant data.

In one embodiment of step 230, symbols are compared to verify the correctness of redundant data. For example, in a mirror configuration, a symbol for data and a symbol for redundant data may be compared. In an embodiment, if the comparison determines that the two symbols are the same, this is an indication that the redundant data in the redundancy scheme is correct. If the comparison determines that the two symbols are not the same, this is an indication that the redundant data in the redundancy scheme is not correct.

Step 230 is not limited to any particular method of using symbols to verify the correctness of redundant data in a redundancy scheme. For example, other operations such as extractions and/or "exclusive or" functions may be applied to symbols in the process of using symbols to verify the correctness of redundant data. Other examples, for illustration only, and not by limitation, are described in further detail later in this disclosure.

Method 200 provides many advantages over conventional redundancy scheme verification methods. In conventional methods, symbols representing data and redundant data are not used. Instead, all of the data and redundant data are transferred to the controller. The controller then processes the sets or groups of data and redundant data. These conventional systems require much greater system resources than method 200. For example, method 200 does not need to transfer all of the data and redundant data across both a storage device interface (e.g., 121 in FIG. 1) and a storage device controller interface (e.g., 113 in FIG. 1). Some embodiments of method 200 only transfer the symbols that represent the data and symbols that represent the redundant data across the interfaces. Also for example, some embodiments of method 200 only require a storage device controller memory (e.g., 115 in FIG. 1) and processing unit (e.g., 114 in FIG. 1) to store and compare symbols representing data and/or redundant data, and not all of the underlying data and/or redundant data.

Figure 3:
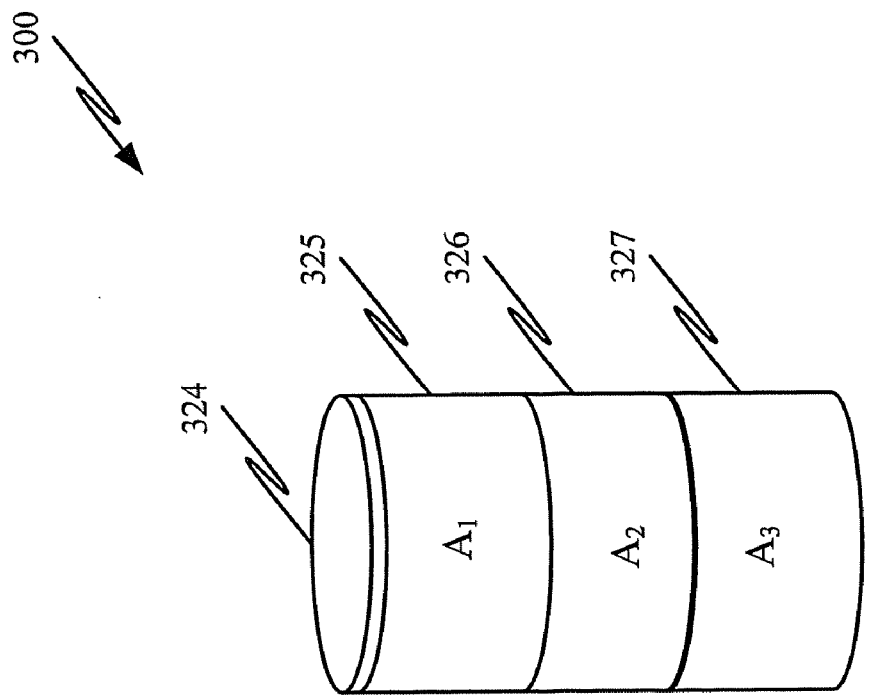
FIG. 3 is a schematic diagram of two storage media in a mirror configuration.
Figure 3:
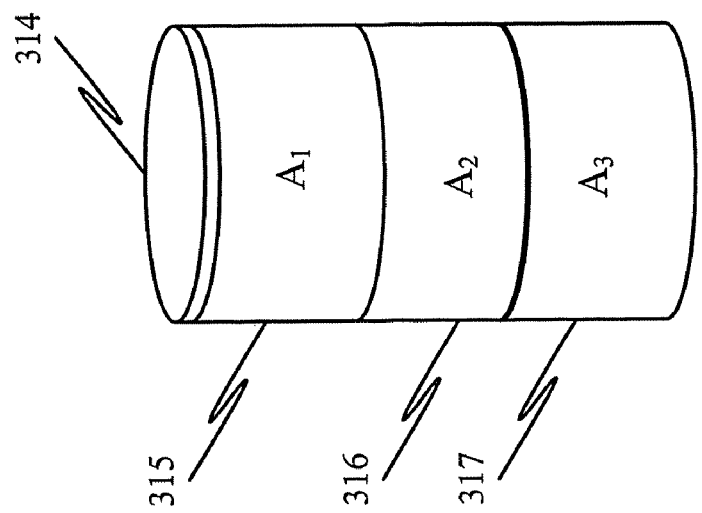

As was previously mentioned, method 200 is illustratively appropriate for use in any of a variety of different types of redundancy schemes such as, but not limited to, mirror and parity configurations. As an example of such a scheme, FIG. 3 is a schematic diagram of two storage media in a mirror configuration 300. In a mirror configuration, one or more physical or logical drives has data, and another one or more physical or logical drives has redundant data that is identical to the data if the redundancy scheme is consistent. Configuration 300 includes storage media 314 and storage media 324. Storage media 314 and 324 are illustratively storage media such as media 124, 134, 144, 154, and 164 in FIG. 1. Media 314 includes three memory blocks 315, 316, and 317. Media 324 includes three memory blocks 325, 326, and 327. In an illustrative mirror configuration, block 315 includes data and block 325 includes redundant data for block 315, block 316 includes data and block 326 includes redundant data for block 326, and block 317 includes data and block 327 includes redundant data for block 327. Although configuration 300 is shown with two storage media each with three memory blocks, embodiments of mirror configurations in which some embodiments of method 200 are used include any number of storage media each with any number of blocks. An illustrative example of a mirror configuration in which method 200 is used includes two flash memory devices or two hard disc drives in a RAID 1 configuration.

Some embodiments of method 200, by example only, and not by limitation, are practiced in systems that have a mirror configuration redundancy scheme. In one example of such an embodiment, for illustration purposes only, symbols are generated for each block in configuration 300 (i.e. 315, 316, 317, 325, 326, and 327) and transferred to a storage device controller. The storage device controller then compares the related blocks (e.g. 315 to 325, 316 to 326, and 317 to 327). In such an embodiment, if the symbols for the related blocks in the mirror configuration are the same, this is an indication that the underlying data is the same, and that the redundancy scheme is consistent. If the symbols for the related blocks are different, this is an indication that the underlying data is not the same, and that the redundancy scheme is not consistent (i.e. the redundant data is not correct).

In another illustrative example, not by limitation, each block in configuration 300 includes multiple sectors such as, but not limited to, one hundred and twenty-eight sectors. In an embodiment, one symbol is generated for each individual sector. In another embodiment, one symbol is generated for multiple sectors. For example, one symbol may be generated for a group of two sectors or for a group of one hundred sectors. In yet another embodiment, one symbol is generated for all of the sectors in a block.

Figure 4:
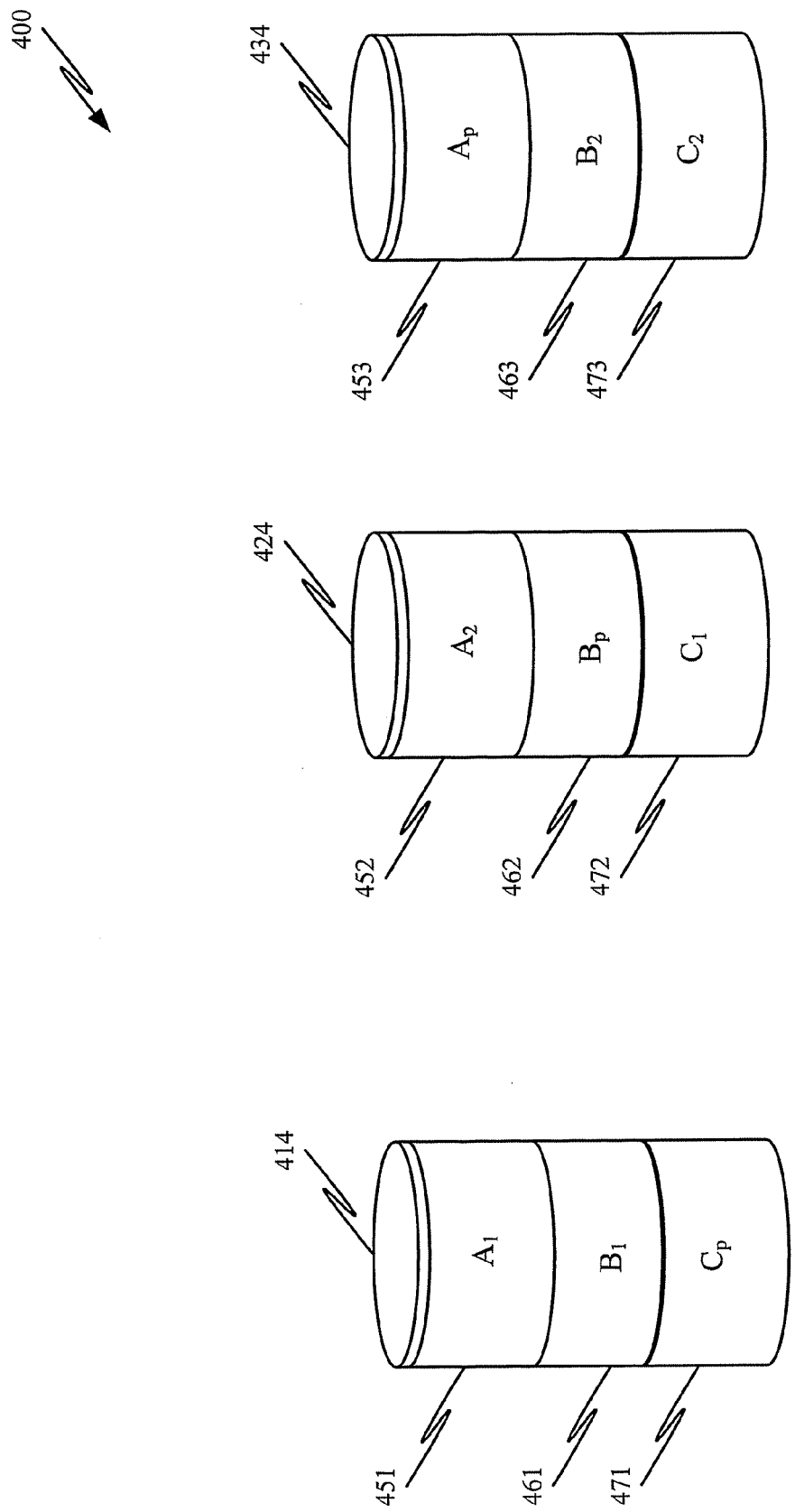
FIG. 4 is a schematic diagram of three storage media in a parity configuration.

As another example of an applicable redundancy scheme, FIG. 4 is an illustrative schematic diagram of three storage media in a parity configuration 400. Configuration 400 includes three parity blocks or parity stripes, stripe A, stripe B, and stripe C. Other configurations in which embodiments of method 200 are practiced include any number of storage media, parity stripes, and parity configurations. Parity stripe A includes two data blocks 451 and 452, and one parity block 453. Parity stripe B includes two data blocks 461 and 463, and one parity block 462. Parity stripe C includes two data blocks 472 and 473, and one parity block 471. In parity configuration 400, no data in a stripe is lost if one of the blocks in the stripe is lost.

Each parity block illustratively includes the result of performing the "exclusive or" ("XOR") operation on the data blocks. For example, in a very simplified situation, data block 451 stores the eight bit word "1111 0000" and data block 452 stores the eight bit word "1010 1010." The result of "XORing" the two words is "0101 1010." This result is stored in parity block 453. If either the data in block 451 or 452 is lost, the data can be recovered by "XORing" the remaining data block with the parity block. Illustrative examples of parity configurations in which method 200 is used include three or more flash memory devices or hard disc drives in a RAID 3, 4, 5, or 6 configuration.

Figure 5:
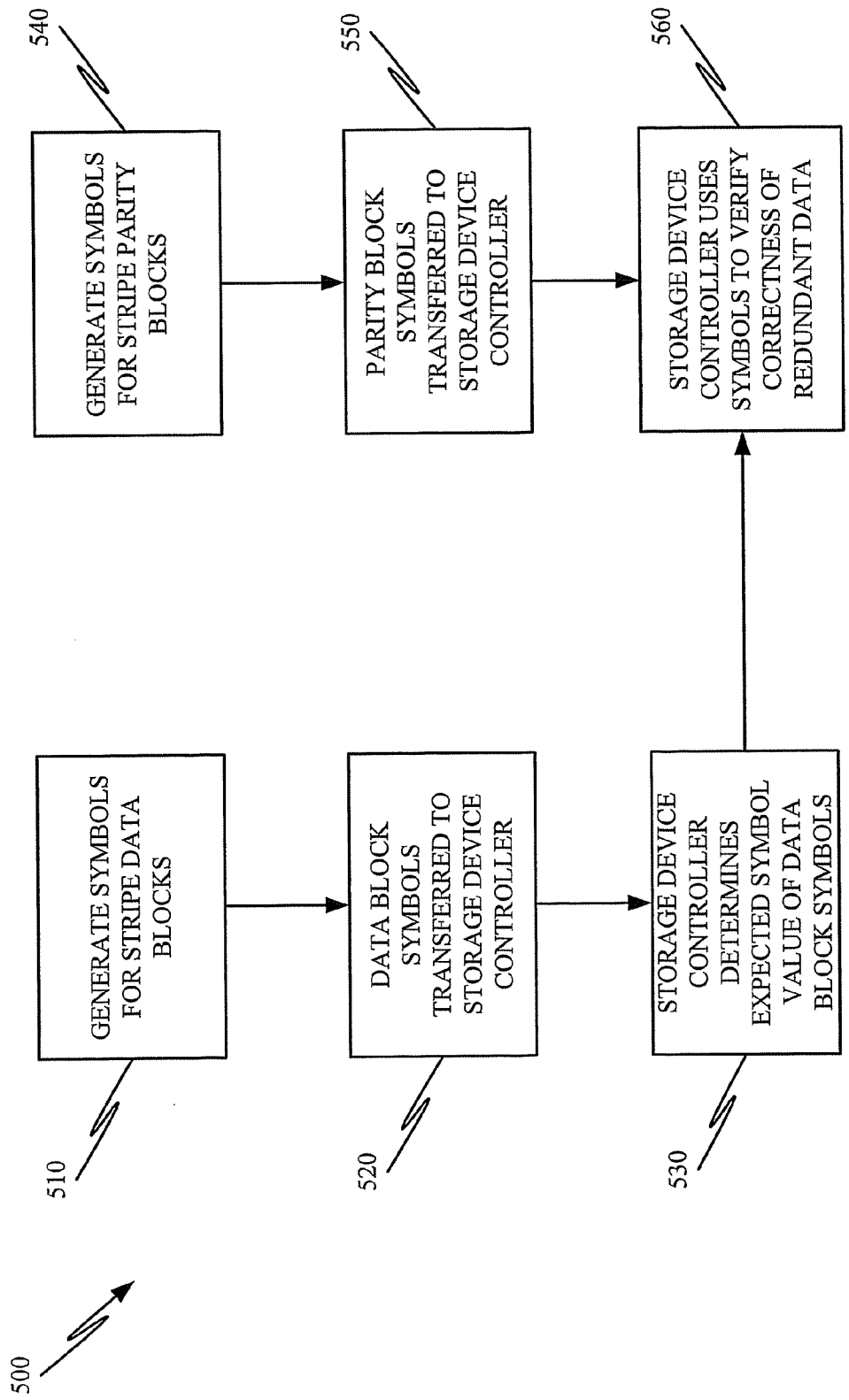
FIG. 5 is a flow diagram of a method of verifying data in a parity scheme.

Some embodiments of method 200, by example only, and not by limitation, are practiced in systems that have a parity configuration redundancy scheme. FIG. 5 is a flow diagram of one illustrative example of a method 500 of verifying data in a parity redundancy scheme according to method 200. At step 510, symbols are generated for each data block in a parity stripe such as data blocks 451, 452, 461, 463, 472, and 473 in FIG. 4. At step 520, the data block symbols are transferred to a storage device controller such as controller 111 in FIG. 1.

At step 530, the storage device controller determines an expected symbol value for data blocks in a parity stripe. For example, in parity configuration 400 in FIG. 4, the symbol for data block 451 and the symbol for data block 452 would be used to determine the expected symbol value for the data blocks in parity stripe A. Similarly, the symbols for data blocks 461 and 463 would be used to determine the expected symbol value for data blocks in parity stripe B, and the symbols for data blocks 472 and 473 would be used to determine the expected symbol value for data blocks in parity stripe C.

In one embodiment, for illustrative purposes only, and not by limitation, the expected symbol value is generated by applying the "exclusive or" function to the two or more symbols. Embodiments of step 530 are not however limited to any given process. Any process or group of processes may be used to generate the expected symbol value. As will become more clear later, in some embodiments, the methods of generating expected symbol values are based upon the type of redundancy scheme used and the relationship of data in the data blocks to redundant data in the parity blocks.

At step 540, symbols are generated for each parity block in a parity stripe such as parity blocks 453, 462, and 471 in FIG. 4. At step 550, the parity block symbols are transferred to the storage device controller. It is worth noting that embodiments of method 500 include various sequential orderings of the steps. For example, either step 510 or 540 is illustratively performed before the other, or the two steps are performed in parallel. In one embodiment, the storage devices generate symbols for each data and parity block in advance such that the symbols are ready to be transferred to the controller upon a user or machine generated request. In yet another embodiment, a storage device controller generates the symbols. Symbols in an illustrative mirror configuration such as configuration 300 in FIG. 3 are similarly prepared in advance and/or by a controller.

At step 560, the storage device controller determines the consistency of the redundancy scheme based at least in part on the expected symbol values of the data blocks (generated/determined at step 530) and the symbols for the parity blocks (generated at step 540). In one example, for illustrative purposes only and not by limitation, the expected symbol value for data blocks 451 and 452 in FIG. 4 is compared to the symbol for parity block 453 in FIG. 4. Similarly, the expected symbol value for blocks 461 and 463 is compared to the symbol for parity block 462, and the expected symbol value for blocks 472 and 473 is compared to the symbol for parity block 471.

As was previously mentioned, in one illustrative example, the expected symbol values determined or generated at step 530 are illustratively calculated by performing the "exclusive or" ("XOR") operation on the data blocks symbols generated at step 510. In an embodiment, the resulting expected symbol values are the same as symbols generated from data obtained by performing the "exclusive or" operation on the underlying data blocks. For example, "XORing" the data in blocks 451 and 452 in FIG. 4, and then generating a symbol according to step 210 in FIG. 2, would result in the same symbol or value as generating a symbol for both blocks 451 and 452 according to step 210, and then "XORing" the two symbols or values to generate the expected symbol value. In such cases, if the data in the parity blocks and the data blocks are related to each other in an "XOR" relationship and the redundancy scheme is consistent, the comparison at step 560 results in a determination that the expected symbol value of the data blocks is the same as the symbol for the parity block. This provides a method of verifying the correctness of the data in the redundancy scheme. Conversely, if the comparison determines that the expected symbol value for the data blocks and the symbol for the parity block are not the same, this provides an indication that the data in the redundancy scheme is not correct (i.e. data would not be recoverable if a storage device was lost).

As was discussed previously, embodiments of method 200 are not limited to any particular manner of generating expected symbol values. Parity configurations of data redundancy schemes use various relationships between data and redundant data. Embodiments of method 200 generate expected symbol values based upon the various possible relationships. In other embodiments, for example only, and not by limitation, no expected symbols are generated, instead a determination is based upon symbols for data blocks and symbols for parity blocks. In some embodiments, methods of evaluating the consistency of the redundant data accommodate for the wide variety of parity configurations and their relationships between data and redundant data.

It is also worth noting that in some embodiments, data blocks and parity blocks include sectors, similar to as was previously described in an illustrative mirror configuration embodiment. In some embodiments of such cases, symbols and expected symbol values are generated for individual sectors in a block. In other embodiments, one symbol or expected symbol value is generated for a group of sectors. In yet another embodiment, one symbol or expected symbol value is generated for all of the sectors in a block Method 500 provides many advantages over conventional parity redundancy scheme verification methods. For example, in one conventional method, all of the data from the data blocks and parity blocks is transferred to the device controller. The device controller then "XORs" the data block data and compares the result to the parity block data. This conventional method requires significant storage device and controller resources in transferring the large amount of data, in performing the "XOR" operation, and in comparing the large data sets. Some embodiments of method 500 reduce these burdens. In some embodiments of method 500, only symbols that represent the data are transferred from the storage devices to the controller, and the controller only needs to perform operations on the symbols and not on all of the underlying data.

Figure 6:
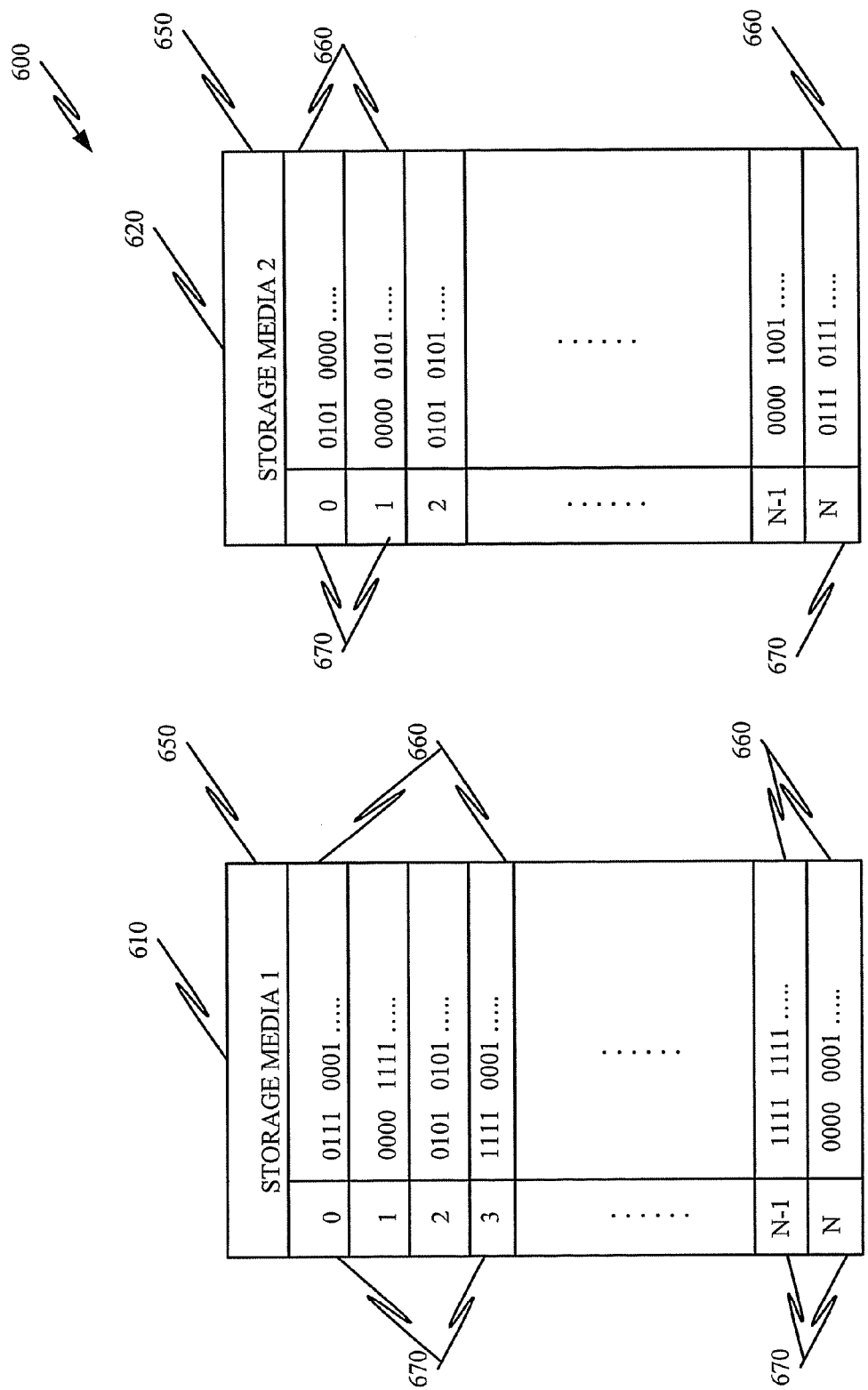
FIG. 6 is a schematic diagram of a storage media configuration with an addressing system.

FIG. 6 is a schematic diagram of an illustrative storage media configuration 600 with an addressing system. Configuration 600 includes two storage media 610 and 620. Media 610 and 620 are illustratively media such as media 124, 134, 144, 154, and 164 in FIG. 1. Each media includes a media identifier 650, blocks 660 (eight blocks are labeled in FIG. 6) and block addresses 670 (eight addresses are labeled in FIG. 6). Media identifiers 650 provide a unique label for each media in a redundancy scheme such that each media can be uniquely identified. Each block 660 within a media corresponds to a unique address 670 that is used to identify the block. Each media includes any number of blocks 660. This is illustrated in FIG. 6 by showing blocks 0, 1, 2, 3, 4, 5 . . . N–1, N, where N is any number. Blocks 660 illustratively store any amount of data such as, but not limited to, 512, 1024, and 2048 bytes.

Some embodiments of the present disclosure, by illustration only and not by limitation, such as system 100, methods 200 and 500, and configurations 300 and 400, employ configuration 600. Some embodiments of the present disclosure also employ other configurations known in the art such as cylinder-head-sector scheme or extended cylinder-head sector scheme.

Steps that generate symbols such as 210 in FIG. 2, and 510 and 540 in FIG. 5, illustratively identify the data or redundant data to be used in generating the symbols by an address such as 670 in FIG. 6. Either data from one block, or data from many blocks, is selectively and optionally used in generating symbols in both mirror and parity configurations. In an embodiment, data from one block or multiple blocks is combined with its or their respective block addresses. In other embodiments, other information may also be combined such as a time stamp. The addresses, data, and possibly other information are illustratively combined using an "XOR" operation. In another illustrative example, the information is combined using concatenation or a hash function. Various methods of combining, representing, and transforming information are known in the art, and the present disclosure is not limited to any particular method or methods. In an embodiment, these combinations are transferred to the device controller and used to verify the consistency of the data in the redundancy scheme. In an embodiment, the device controller optionally processes the combination. Illustrative processes include, but are not limited to, extracting and/or parsing address information, redundant data information, and/or a time stamp.

It is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of steps within the principles of the present disclosure to the full extent indicated by the broad general meaning of the terms in which the appended claims are expressed. In addition, although the embodiments described herein are directed to hard disc drives and flash memory devices, it will be appreciated by those skilled in the art that the teachings of the disclosure can be applied to other types of data storage systems, without departing from the scope and spirit of the disclosure.

What is claimed is:

1. A data storage system comprising:
   a plurality of storage devices arranged in a redundancy scheme; and
   a storage device controller arranged to verify the consistency of the redundancy scheme responsive to a plurality of symbols, each of the plurality of symbols being representative of data in the redundancy scheme, the storage device controller utilizing at least two of the plurality of symbols to generate a value that is compared to another one of the plurality of symbols to verify the consistency, and the data corresponding to the at least two of the plurality of symbols being related to the data corresponding to the another one of the plurality of symbols through an application of an XOR function.

2. The data storage system of claim 1 wherein the storage device controller generates the symbols, and wherein the storage device controller applies another XOR function to the at least two of the plurality of symbols to generate the value.

3. The data storage system of claim 1 wherein the plurality of storage devices generate the symbols.

4. The data storage system of claim 1 wherein the symbols are generated from a mathematical process and are smaller than the data in the redundancy scheme that they represent.

5. The data storage system of claim 1 wherein at least one of the data storage devices includes solid state memory.

6. The data storage system of claim 1 wherein at least one of the data storage devices includes magnetic memory.

7. The data storage system of claim 1 wherein at least one of the data storage devices is a solid state drive (SSD) and at least one of the data storage devices is a hard disk drive (HDD).

8. A data storage system comprising:
   a first data storage device having a first set of data and a first symbol that is representative of the first set of data;
   a second data storage device having a second set of data and a second symbol that is representative of the second set of data;
   a third data storage device having a third set of data and a third symbol that is representative of the third set of data, the first and the second sets of data being related to the third set of data through an application of an XOR function; and a storage device controller that utilizes the first, the second, and the third symbols to verify consistency of a common redundancy scheme of the first, the second, and the third data storage devices.

9. The data storage system of claim 8 wherein the storage device controller applies a function to the first and the second symbols to generate a value, and wherein the storage device controller makes a determination of whether or not the data in the common redundancy scheme is consistent based at least in part on a comparison of the generated value to the third symbol.

10. The data storage system of claim 9 wherein the first and the second sets of data comprise data blocks, and wherein the third set of data comprises a parity block.

11. The data storage system of claim 10 wherein the function is another XOR function.

12. The data storage system of claim 8 wherein the common redundancy scheme comprises a parity configuration, wherein the storage device controller generates an expected symbol value based at least in part on the first symbol and the second symbol, and wherein the storage device controller makes a determination of whether or not the data in the common redundancy scheme is consistent based at least in part on a comparison of the expected symbol value to the third symbol.

13. The data storage system of claim 8 wherein the first, the second, and the third symbols are generated by the storage device controller.

14. The data storage system of claim 8 wherein the first symbol is generated by the first data storage device, wherein the second symbol is generated by the second data storage device, and wherein the third symbol is generated by the third data storage device.

15. The data storage system of claim 8 wherein at least one of the data storage devices comprises a solid state drive (SSD).

16. A data storage system comprising:
a first storage device comprising a first media identifier, a first plurality of block addresses, a first plurality of data blocks, and a first plurality of symbols, each of the first plurality of data blocks corresponding to one of the first plurality of block addresses, each of the first plurality of data blocks comprising data, and the first plurality of symbols being based at least in part on the data in the first plurality of data blocks;
a second storage device comprising a second media identifier, a second plurality of block addresses, a second plurality of data blocks, and a second plurality of symbols, the first storage device and the second storage device being part of a common redundancy scheme, each of the second plurality of data blocks corresponding to one of the second plurality of block addresses, each of the second plurality of data blocks comprising data, the second plurality of symbols being based at least in part on the data in the second plurality of data blocks, the data in the first plurality of data blocks and the data in the second plurality of data blocks being related to data in a third plurality of data blocks through an application of an XOR function; and
a storage device controller that verifies a consistency of the common redundancy scheme based at least in part on the first and the second plurality of symbols.

17. The data storage system of claim 16 wherein each of the first plurality of symbols corresponds to one of the first plurality of data blocks, and wherein each of the second plurality of symbols corresponds to one of the second plurality of data blocks.

18. The data storage system of claim 16 wherein each of the first plurality of data blocks and each of the second plurality of data blocks comprise sectors.

19. The data storage system of claim 18 wherein each of the first plurality of symbols corresponds to one of the sectors of the first plurality of data blocks, and wherein each of the second plurality of symbols corresponds to one of the sectors of the second plurality of data blocks.

20. The data storage system of claim 18 wherein each of the first plurality of symbols corresponds to a group of sectors of the first plurality of data blocks, and wherein each of the second plurality of symbols corresponds to a group of sectors of the second plurality of data blocks.

21. The data storage system of claim 16 wherein the first plurality of symbols and the second plurality of symbols are generated using the same mathematical process.

22. The data storage system of claim 21 wherein the symbols of the first plurality of symbols and the second plurality of symbols are each smaller than the data used to generate the symbols.

23. The data storage system of claim 22 wherein the symbols are each smaller comprises the symbols including fewer bits than the data used to generate the symbols.

24. The data storage system of claim 16 wherein the storage device controller verifies the consistency of the common redundancy scheme based at least in part on applying another XOR function to the first and the second symbols.

* * * * *